United States Patent
Gütl et al.

(10) Patent No.: US 12,013,512 B2
(45) Date of Patent: Jun. 18, 2024

(54) LIGHT BARRIER SYSTEM, COMPRISING AT LEAST TWO REFLECTION LIGHT BARRIER DEVICES

(71) Applicant: KNAPP AG, Hart bei Graz (AT)

(72) Inventors: Bernhard Gütl, Hart bei Graz (AT); Marc Pendl, Hart bei Graz (AT); Franz Mathi, Hart bei Graz (AT)

(73) Assignee: KNAPP AG, Hart bei Graz (AT)

( * ) Notice: Subject to any disclaimer, the term of this patent is extended or adjusted under 35 U.S.C. 154(b) by 0 days.

(21) Appl. No.: 17/760,156

(22) PCT Filed: Jan. 20, 2021

(86) PCT No.: PCT/AT2021/060018
§ 371 (c)(1),
(2) Date: Aug. 4, 2022

(87) PCT Pub. No.: WO2021/159156
PCT Pub. Date: Aug. 19, 2021

(65) Prior Publication Data
US 2023/0081936 A1 Mar. 16, 2023

(30) Foreign Application Priority Data
Feb. 12, 2020 (AT) .................... 50108/2020

(51) Int. Cl.
*G01V 8/22* (2006.01)
*B65G 69/20* (2006.01)

(52) U.S. Cl.
CPC ............... *G01V 8/22* (2013.01); *B65G 69/20* (2013.01)

(58) Field of Classification Search
CPC ... G01V 8/20; G01V 8/10; G01V 8/12; G01V 8/14; G01V 8/22; F16P 3/144;
(Continued)

(56) References Cited

U.S. PATENT DOCUMENTS 4,709,580 A * 12/1987 Butts, Jr. ................. G01S 17/50
356/28
5,920,394 A * 7/1999 Gelbart ................... G01S 17/66
356/615
(Continued)

FOREIGN PATENT DOCUMENTS

DE 10019921 A1 10/2001
EP 2237076 A1 10/2010
WO 02/12828 A2 2/2002

OTHER PUBLICATIONS

International Search Report, dated May 12, 2021, from PCT Application No. PCT/AT2021/060018.

*Primary Examiner* — Thanh Luu
*Assistant Examiner* — Monica T Taba
(74) *Attorney, Agent, or Firm* — Workman Nydegger

(57) ABSTRACT

The invention relates to a light barrier system, comprising at least two reflection light barrier devices, each of which is configured to emit a light beam and to detect a reflected light beam, wherein the light barrier system comprises a reflection body, which is configured to reflect back light beams emitted from at least two different directions in parallel, which are spaced apart at an angle of at least 20°, wherein the at least two reflective light barrier devices are arranged in such a way that they emit light beams from different directions onto the same reflection body in order to monitor at least two spatially different areas. In a further aspect, the invention relates to the use of a reflection body.

9 Claims, 4 Drawing Sheets

(58) Field of Classification Search
CPC . F21V 15/01; F21V 21/14; F21V 5/04; H01L 25/167; H01L 31/12; H01L 33/08
See application file for complete search history.

(56) References Cited

U.S. PATENT DOCUMENTS

| | | | | |
|---|---|---|---|---|
| 5,969,339 | A * | 10/1999 | McMurray | G05B 19/4183 |
| | | | | 901/7 |
| 6,123,427 | A * | 9/2000 | Hinderling | G01C 15/06 |
| | | | | 359/834 |
| 2008/0074642 | A1* | 3/2008 | Hoersch | G01D 5/30 |
| | | | | 356/28 |
| 2014/0320640 | A1* | 10/2014 | Barbier | G01B 11/26 |
| | | | | 348/135 |

* cited by examiner

LIGHT BARRIER SYSTEM, COMPRISING AT LEAST TWO REFLECTION LIGHT BARRIER DEVICES

The present application is a U.S. National Stage of International Application No. PCT/AT2021/060018, filed on Jan. 20, 2021, designating the United States and claiming the priority of Austria Patent Application No. A 50108/2020 filed with the Austria Patent Office on Feb. 12, 2020. All of the aforementioned applications are incorporated herein in their respective entireties by this reference.

The invention relates to a light barrier system comprising at least two reflective light barrier devices, which each comprise a light beam source for emitting a light beam and a sensor for detecting the reflected light beam. In a further aspect, the invention relates to the use of a reflection body in a light barrier system.

Light barrier systems are used in various fields of application and allow for monitoring a path section or the like. For this purpose, a reflection light barrier device is used, for example, which emits a light beam onto a reflection body such as a mirror. The reflection body reflects the light beam back in the same direction, from which the light beam was incident on the reflection body. In this way, the reflected light beam or its absence, respectively, may be detected by a sensor of the reflection light barrier system.

Each reflection light barrier system thus forms a separate pair with the reflection body thereof. In order to monitor several areas of a path section, consequently, several pairs consisting of reflection light barrier system and the reflection body are positioned along the path.

However, in some applications, particularly in conveyor systems, in which a conveyor section is to be monitored by means of light barriers, there is available only little space for positioning the reflection light barrier devices or the reflection bodies, respectively. Furthermore, since the mounting positions of these instruments are difficult to access, their calibration is tedious and time-consuming, since each pair consisting of a reflection light barrier device and a reflection body must be calibrated separately.

It is therefore an objective of the invention to create a light barrier system, which overcomes the disadvantages of prior art and, in particular, is space-saving and easy to calibrate.

According to the invention, this objective is achieved with a light barrier system, which comprises at least two reflection light barrier devices, which are each configured to emit a light beam and to detect a reflected light beam, wherein the light barrier system comprises a reflection body, which is configured to reflect back light beams emitted from at least two different directions in parallel, which are spaced apart at an angle of at least 20°, wherein the at least two reflection light barrier devices are arranged in such a way that they emit light beams from different directions onto the same reflection body in order to monitor at least two spatially different areas.

This light barrier system is characterized in that all reflection light barrier devices share a single reflection body and therefore the number of reflection bodies in the system may be reduced. This is particularly advantageous in those areas of application where the installation space available is limited.

In addition to the advantage of the space-saving design, the light barrier system according to the invention has the further advantage that it is insensitive to torsion of the reflector, which reduces the occurrence of errors in the light barrier system and simplifies calibration. The common reflection body also has the advantage that the reflection light barrier devices may be easily adjusted in the course of implementation.

As the reflection body of the light barrier system according to the invention is at least configured to reflect back light beams in parallel, which are spaced apart at an angle of at least 20°, several different spatial areas may be monitored using a single reflection body. For example, the reflection body may have a suitable curvature to reflect back all light beam in parallel that are incident from that angular range, or at least two flat surfaces that are situated at a corresponding angle to each other. Similarly, the at least two reflection light barrier devices may be arranged in such a way that these have light beams be incident on the common reflection body, which are spaced apart at an angle of at least 20°.

Preferably, the reflection body is configured to reflect back in parallel all emitted light beam that have been emitted in a predetermined angular range about an axis, wherein the angular range is preferably at least 180°, particularly preferably substantially 360°. This angular range is also called the reflection range. The axis preferably runs through the reflection body. This solution allows the reflection light barrier devices to be positioned freely around the reflection body in said angular range and also allows retroactive addition of reflection light barrier devices or displacement of reflection light barrier devices in said angular range without having to take into account special properties of the reflection body. It is understood that even with this design of the reflection body, only a discrete number of reflection light barrier devices will be provided, e.g. at least two.

In order to achieve the desired property of the reflection body that light beam emitted from at least two different directions are reflected back in parallel, the reflection body may be configured, for example, as follows.

In order to enable the reflection body to have a reflection range of at least 180° and preferably up to 360°, there may be used two preferred embodiments. In the first preferred embodiment, the reflection body has an essentially spherical basic shape. As a result, the reflection body has the characteristic that there is achieved not only a reflection range of up to 360° about an axis perpendicular thereto, for example, but rather also a reflection range of up to 360° about an axis orthogonal thereto. In this embodiment, the reflection body may preferably be configured as a pentagonal-dodecahedron in order to allow for easier production or improved reflection properties. In this case, the pentagonal-dodecahedron with its essentially spherical basic shape has essentially flat surfaces, which can be provided with triple prisms or reflector foils as described below.

In the second preferred embodiment, the reflection body has a substantially cylindrical basic shape, i.e. it has a base that is linearly extruded. This makes it possible that the reflection body has a reflection range of around 360°, for example about a vertical axis. A reflection range about axes orthogonal to the axes mentioned may be obtained by way of triple prisms or reflector foils, respectively. The basic cylindrical shape allows for simpler production than the basic spherical shape.

With the embodiment of the reflection body having a cylindrical base shape it is particularly preferred that this has a substantially circular base. Alternatively, it could also be oval, for example, in order to provide a larger impact surface for incident light beams in one direction. In any case, the basic shape or base, respectively, may in any case be approximated by way of buckles, not having to be continuous. This allows, for example, that reflector foils having buckles smaller than the angle of reflection may situated next to one another.

In general, the reflector body could have a surface as smooth as glass, for example having a spherical or cylindrical basic shape, in order to enable light rays emitted from two different directions to be reflected back in parallel. However, due to manufacturing inaccuracies or deviations from a purely spherical or cylindrical basic shape, respectively, it is, however, preferred that the surface of the reflection body be equipped according to one of two embodiments explained below.

According to the first preferred embodiment, at least a part of the surface of the reflection body has incorporated triple prisms. In this embodiment, the surface of the spherical or cylindrical basic shape, for example, may be processed in such a way that it has a surface structure having one or more triple prisms. In this embodiment, it is particularly advantageous if the basic shape of the reflection body is approximated to a spherical or cylindrical shape, for example as a pentagonal-dodecahedron, or if the base of the cylindrical basic shape is approximated by way of buckles.

According to the second preferred embodiment, at least a part of the surface of the reflection body is covered by a reflective foil. Such reflector foils have been sufficiently known from prior art and may be purchased cheaply. This allows for the reflection body to be easily manufactured, for example by applying the reflective foil onto an insufficiently reflective or non-reflective basic body.

Reflector surfaces that are provided with triple prisms, for example, have the advantage over reflector foils in that they reflect better. However, reflector foils have the advantage that the reflection body can be manufactured more easily. It is also possible to provide the reflection body in part with a reflector foil and in part with a reflector surface such that the advantages of both embodiments may be combined.

A particularly simple embodiment of the reflection body is a plate, which is equipped with a reflector surface or reflector foil, respectively, on both sides. However, the disadvantage here is that incident light beams from acute angles may be reflected only poorly or not at all. Improved reflectors are therefore particularly advantageous for light barrier systems in conveyor systems. Reflectors having a spherical or cylindrical base in combination with a reflector surface having triple prisms or a reflector foil are therefore preferably used for light barrier systems in order to enable uniform light reflection in at least two or preferably all, respectively, directions.

Preferably, the invention may provide a conveyor system, which comprises a conveyor section (conveyor line) having at least two areas and a light barrier system according to one of said embodiments, wherein the reflection light barrier devices and the reflection body are arranged with respect to the conveyor section in such a way that two different areas of the conveyor section are being monitored. Previously, it has been common practice to position multiple pairs consisting of the reflection light barrier device and the reflection body along a conveyor section in order to monitor multiple areas. Due to the limited space available in conveyor systems, an advantageous conveyor system may be created by the solution according to the invention.

In conveyor systems, there are usually two parallel conveyor paths. In such applications, it is preferred if the reflection body is arranged between the conveyor paths and the reflection light barrier devices respectively on a side of the conveyor paths facing away from the reflection body. The reflection body according to the invention may be dimensioned particularly small such that it can be easily positioned between the conveyor paths. Preferably, in this embodiment, there is used at least one reflection light barrier device, which emits light beams onto the reflection body in a third direction, which is parallel to a conveyor direction of the two conveyor paths mentioned.

In a further aspect, the invention relates to the use of a reflection body in a light barrier system or in a conveyor system, wherein the same embodiments as described above may be herein used.

Advantageous and non-restrictive embodiments of the invention are explained in greater detail below with reference to the drawings.

Figure 2:
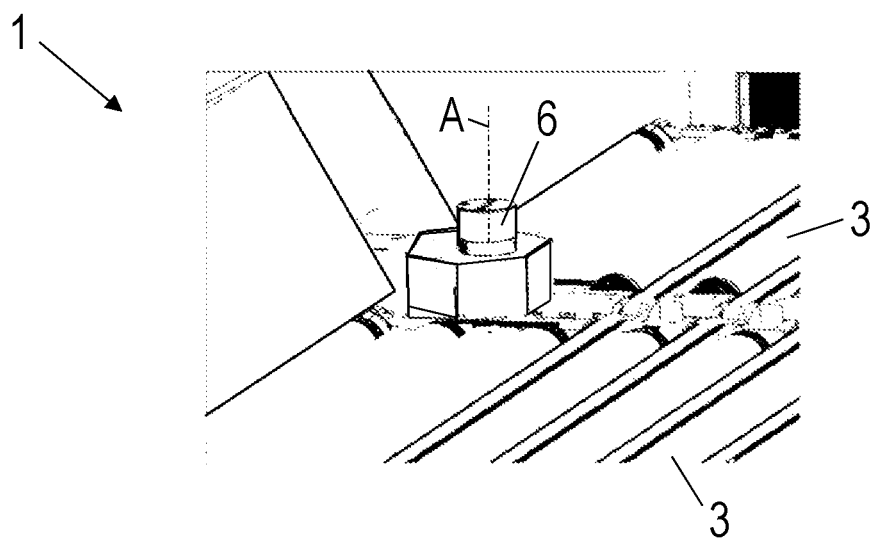
FIG. 2 shows the reflection body of the light barrier system of FIG. 1 in detail.
Figure 3:
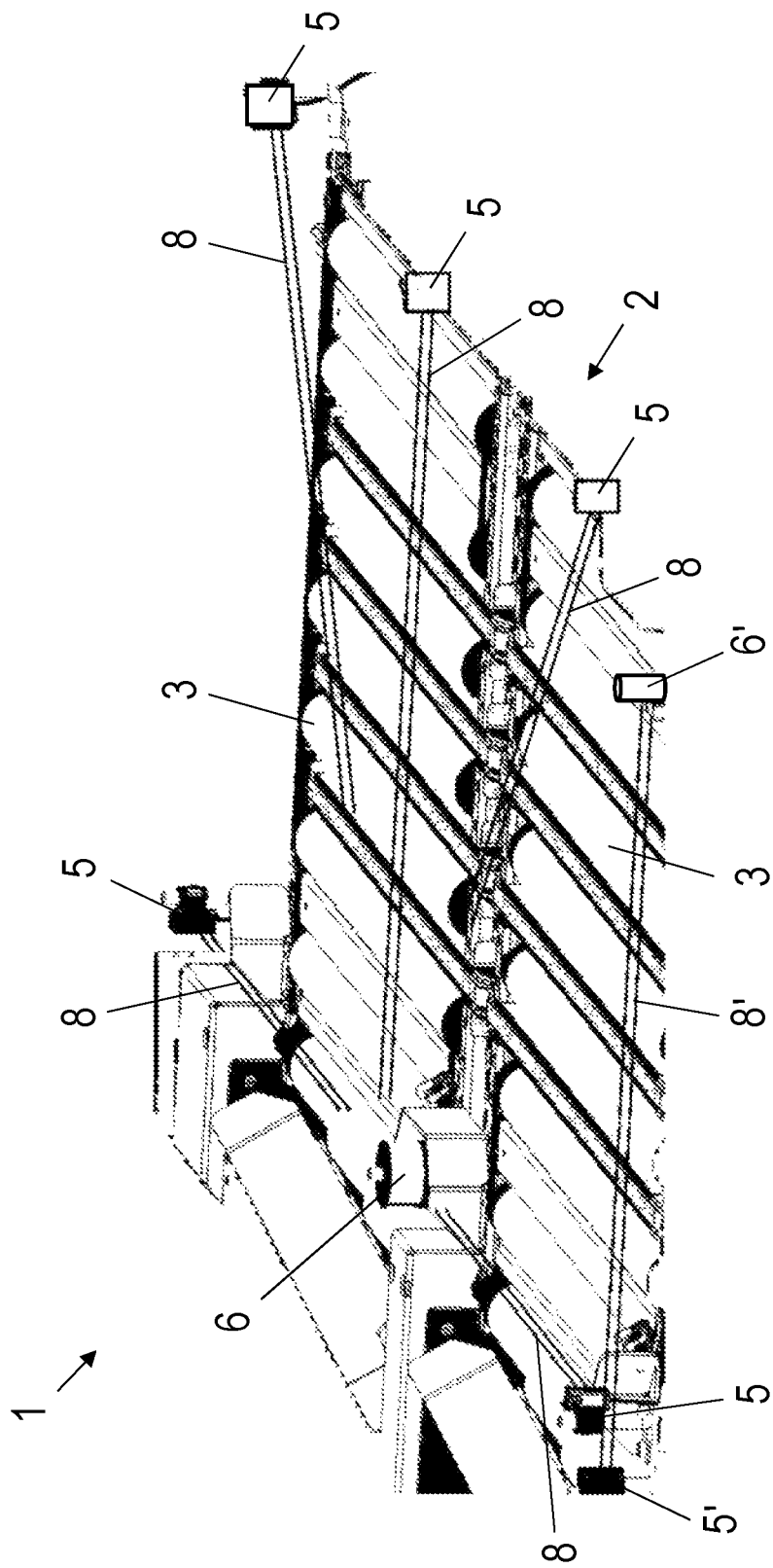
Figure 4:
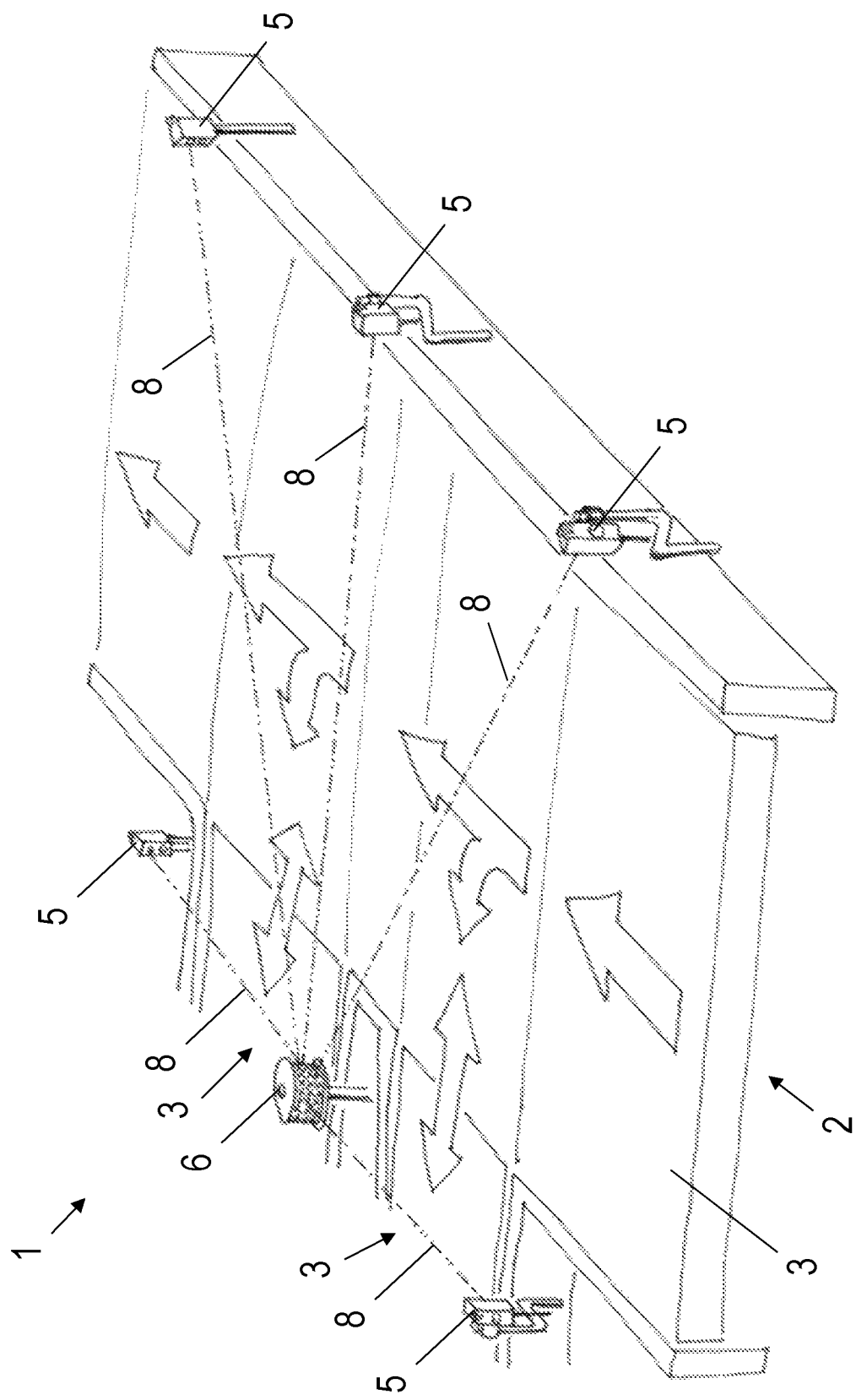
Figure 5:
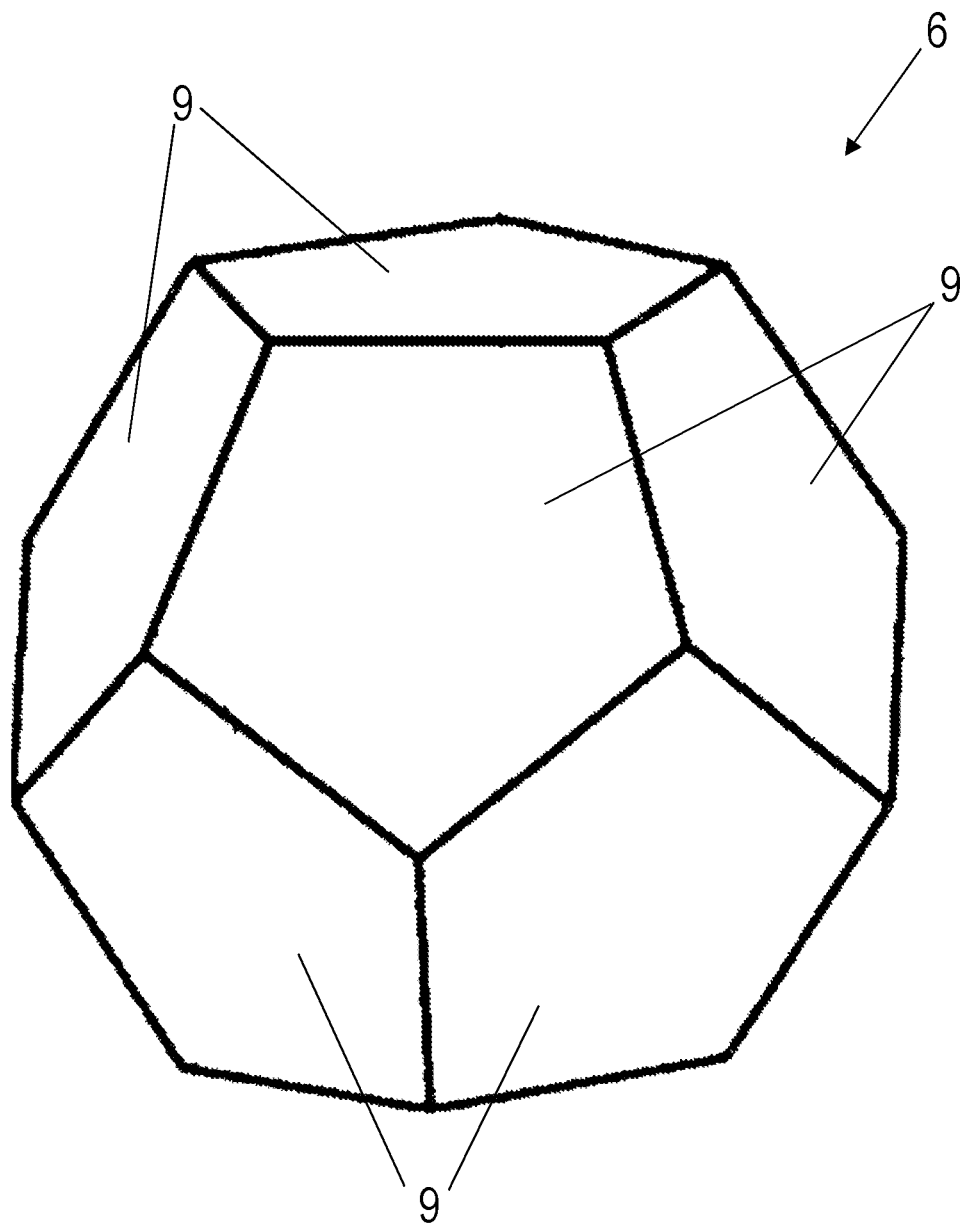

The FIGS. 3 and 4 show further variants of the conveyor system in schematic perspectives. FIG. 5 shows an alternative embodiment of the reflection body of FIG. 2.

Figure 1:
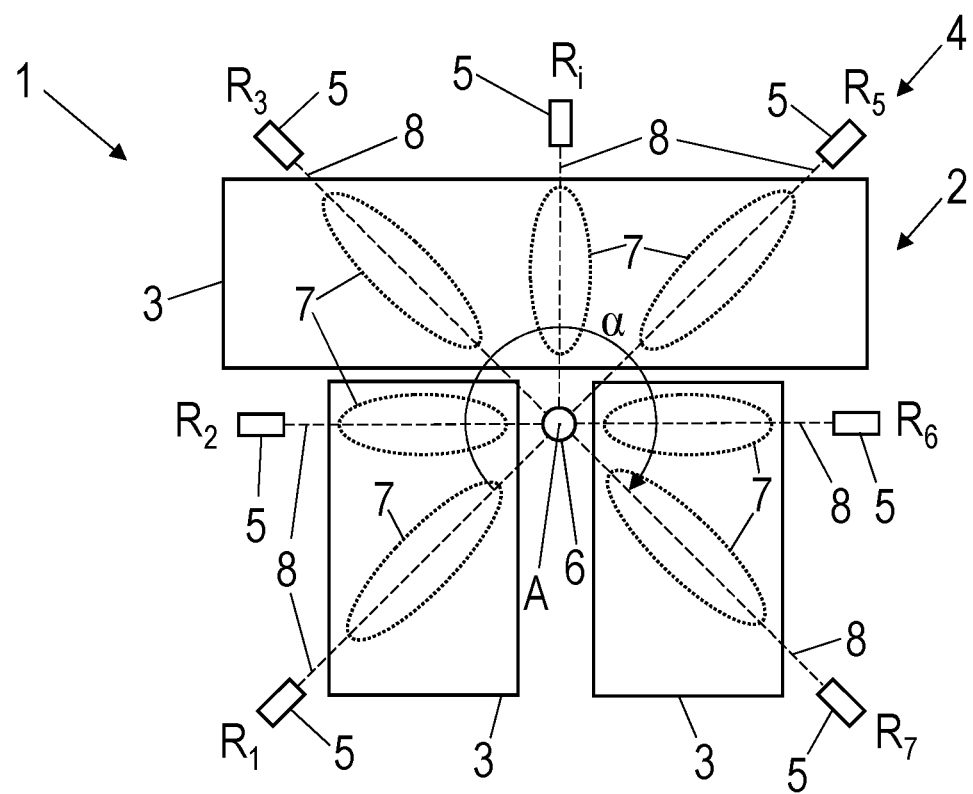
FIG. 1 shows a conveyor system with a light barrier system according to the invention in a top view.

FIG. 1 shows a conveyor system 1, which comprises a conveyor section 2 having several conveyor paths 3 and a light barrier system 4. The light barrier system 4 shown comprises seven reflection light barrier devices 5 and a reflection body 6 to monitor at least two spatially different areas 7. The light barrier system 4 is described below for use in a conveyor system 1, but may generally also be used in other areas, where multiple spatial areas 7 are to be monitored.

The light barrier system 4 may generally comprise at least two or at least three reflection light barrier devices 5 instead of the seven reflection light barrier devices 5 shown. Each of the reflective light barrier devices 5 comprises a light beam source for emitting a light beam 8 and a sensor for detecting the light beam 8 reflected by the reflection body 6. The sensor may then indicate or output, respectively, the detection of the reflected light beam 8 either when the reflected light beam 8 is registered or when an absence of the reflected light beam 8 is registered.

In combination, the emitted light beam 8 and the reflected light beam 8 form a light barrier. The light beam 8 or the light barrier, respectively, may have a wavelength that is in the visible wavelength range or in the non-visible wavelength range. In particular, the light beam 8 may also be a laser beam. In order to generate the light beam 8, the light beam source may comprise, for example, a light emitting diode that generates the light beam with a wavelength of, for example, 660 nm (visible red light) or 880 to 940 nm (non-visible infrared light).

Usually, in a state-of-the-art light barrier system, a separate reflector is provided for each reflection light barrier device 5, for example a reflective pane. For a state-of-the-art light barrier system having, for example, seven reflection light barrier devices 5, there would then be used seven reflectors. The light barrier system 4 according to the invention, however, has a common reflection body 6 for the at least two reflection light barrier devices 5. For this purpose, the reflection light barrier devices 5 are arranged in such a way that they emit light beams 8 from different directions R1 . . . R7, generally Ri, onto the same reflection body 6 in order to monitor the at least two spatially different areas 7. At least two of the reflection light barrier devices 5 may be arranged in such a way that they emit light beams 8 onto the reflection body 6, which are spaced apart at an angle of at least 20°, at least 45°, at least 90° or at least 180°.

In the example shown in FIG. 1, the directions Ri are at different angles about an axis A, which is perpendicular in the installation position of the light barrier system 4, and thus lie in a common plane. The different angles of the directions Ri all lie within a predetermined angular range α. Alternatively, the directions Ri could also lie in a common plane, which does not extend horizontally in the installation position of the light barrier system 4 but rather, for example, perpendicular, or which could also not lie in a common plane.

The reflection body 6 is configured in such a way that it can reflect back light beam 8 emitted from at least two different directions Ri in parallel. For this purpose, the reflection body 6 may have a corresponding basic shape and/or a corresponding surface structure. For example, the directions Ri are spaced apart at an angle of at least 20°, at least 45°, at least 90° or at least 180°.

The reflection body 6 may also be configured to reflect back in parallel all emitted light beams 8 that were emitted in a predetermined angular range α about the common axis A. The angular range α is preferably at least 180° or at least 270°, particularly preferably substantially 360°. This may be achieved, for example, by a cylindrical or spherical basic shape of the reflection body 6. If the angular range α is smaller than 360°, a segment of a cylindrical or spherical shape may also be used for this purpose. The reflection body 6 could also be configured to reflect back light rays 8 back from essentially all directions Ri, which may be achieved, for example, by a spherical basic shape of the reflection body 6.

FIG. 2 shows a reflection body 6 having a substantially cylindrical basic shape. A substantially cylindrical basic shape is understood to be a substantially linearly extruded base, which may also be formed by situating next to one another flat surfaces to approximate the cylindrical shape. Reflection bodies 6 having a basic cylindrical shape are particularly suitable for reflecting back light beam 8 emitted from different directions Ri, which all lie in a common plane.

Reflection bodies 6 having an essentially cylindrical basic shape may, for example, have a circular base. Alternatively, the base could be oval or otherwise shaped. The base also need not be continuous, but may rather also be shaped by straight lines (buckles) placed end to end. The angle between the straight lines is, for example, smaller than a reflection angle of a reflector foil or a reflector surface as described below. The cylindrical basic body may also be formed, for example, by flat hexagons arranged next to one another.

FIG. 3 shows a variant of the conveyor system 1, in which a conveyor section 2 has an essentially straight first conveyor path 3 and a second conveyor path 3 running in parallel thereto. The reflection body 6 is arranged herein in such a way that it is situated in-between the two conveyor paths 3. Five reflection light barrier devices 5 are directed towards the reflection body 6 in such a way that one of the light beams 8 crosses the first conveyor path 3 and one of the light beams 8 crosses the second conveyor path 3 at an angle. Two further laser beams 8 cross the first or second conveyor path 3, respectively, orthogonally to the conveyor paths 3. Another laser beam 8 extends in parallel to the conveyor paths 3, but rather in-between these, in order to detect whether a conveyed item switches from one conveyor path 3 to the other conveyor path 3.

In addition, it is shown in FIG. 3 that a further reflection body 6' and a further reflection light barrier device 5' are arranged on that side of the first conveyor path 3, which faces away from the second conveyor path 3. This allows a light beam 8' to be arranged in parallel next to the first travel path 3 and to detect when a conveyed item leaves the conveyor path 3.

FIG. 4 shows another variant of the conveyor system 1, in which a conveyor section 2 has a substantially straight first conveyor path 3 with a second and a third conveyor path 3, wherein the second and the third conveyor path 3 connecting thereto on the same side of the first conveyor path 3 and running in parallel to one other. The reflection body 6 is herein arranged in such a way that it is situation in-between the three conveyor paths 3. Five reflection light barrier devices 5 are directed towards the reflection body 6 in such a way that one of the light beams 8 crosses the second conveyor path 3 and one of the light beams 8 crosses the third conveyor path 3. The further three light beams 8 cross the first conveyor path 3 in such a way that a turning area to the second conveyor path 3, a turning area to the third conveyor path 3 and an area between the two turning areas are being monitored.

FIG. 5 shows a reflection body 6 having an essentially spherical basic shape. The basic spherical shape is approximated by way of a pentagon-dodecahedron. A pentagon-dodecahedron has twelve flat surfaces 9, i.e. twelve pentagons, which are particularly suitable for incorporating a desired surface structure or for bonding a reflector foil onto these. Alternatively, the basic spherical shape could also be round with a continuous surface.

It is understood that the reflection body 6 may also have a basic shape formed by a segment of a cylindrical basic shape (cylinder segment) or by a segment of a spherical basic shape (sphere segment). The reflection body 6 could also have a basic shape, which is formed by a hemisphere placed on a cylinder. Also, the reflection body 6 could have a cuboidal or cube-shaped basic shape.

In order to further improve the characteristic of reflecting back light rays emitted from two different directions in parallel, there may be made provision to equip the surface of the reflection body 6 with a reflector surface or a reflector foil.

The reflector surface is usually incorporated directly into the surface of the reflection body, for example in the form of triple prisms. A reflector foil, on the other hand, may be applied to the surface of the reflection body 6, e.g. bonded thereon. It has been known from prior art, for example, to apply glass spheres having a diameter of 50 μm to a reflective foil in order to form the reflector foil. The triple prisms of the reflector surface or the glass spheres of the reflector surface, respectively, enable all incident light rays to be reflected back in parallel, which are incident at a predetermined angle of reflection to an orthogonal direction of the surface. As this angle of reflection is usually much smaller than 90°, the reflector surfaces or the reflector foils are used in combination with a cylindrical or spherical basic shape of the reflector body in order to obtain angles of reflection of at least 180° up to 360° within a plane or in order to be able to reflect light rays back in parallel from all spatial directions at all.

In FIG. 1 there is shown, as explained, that the light barrier system 4 having the at least two reflection light barrier devices 5 and the common reflector 6 is used in a conveyor system 1 having a conveyor section 2 with several conveyor paths 3. More generally, the light barrier system 4 could also be used in a conveyor section 2 consisting of a single straight or curved conveyor path 3. In this case, the reflection light barrier devices 5 would all be located on one side of the conveyor path 3 and the reflection body 6 would be arranged on the other side of the conveyor path 3.

As shown in FIG. 1, the conveyor system 1 has a conveyor section 2 with two conveyor paths 3 parallel to each other, whereby the conveyor paths 3 may be configured to transport items to be conveyed in different directions. Connecting the two conveyor paths 3, there could be provided a picking station 10, at which the items to be conveyed are processed by a picking person. However, the picking station 10 shown could also be configured as a further conveyor path 3.

In the embodiment example with two conveyor paths 3 extending in parallel to each other, the reflection body 6 is preferably arranged in-between the conveyor paths 3. The reflection light barrier devices 5 are each arranged on a side of the conveyor paths 3 facing away from the reflection body 6. The reflection light barrier devices 5 may thus advantageously share a common reflection body 6 in order to simultaneously monitor several spatial areas 7 of the conveyor section 2. If there is given a picking station 10 extending substantially orthogonally to the conveyor paths 3, the reflection body 6 may be arranged between the two conveyor paths 3 and the picking station 10. In this case, the reflection light barrier devices 5 are situated on a side of the conveyor paths 3 or the picking station 10, respectively, facing away from the reflection body 6.

The invention claimed is:

1. A conveyor system comprising:
a conveyor section having at least a first conveyor path, a second conveyor path, and a light barrier system, the light barrier system comprising at least two reflection light barrier devices, which are each configured to emit a light beam and to detect a reflected light beam, wherein
the light barrier system comprises a reflection body, which is configured to reflect back in parallel light beams emitted from at least two different directions, which are spaced apart at an angle of at least 20°, wherein the at least two reflection light barrier devices are arranged in such a way that they emit light beams from different directions onto the same reflection body in order to monitor at least two spatially different areas, and
wherein the reflection light barrier devices and the reflection body are arranged with respect to the conveyor section in such a way that a first area over the first conveyor path and a second area over the second conveyor path are being monitored.

2. The conveyor system according to claim 1, wherein the reflection body is configured to reflect back in parallel all emitted light beams, which have been emitted within a predetermined angular range ($\alpha$) about an axis (A), wherein the angular range ($\alpha$) is at least 180° or substantially 360°.

3. The conveyor system according to claim 1, wherein the reflection body has a substantially spherical basic shape.

4. The conveyor system according to claim 1, wherein the reflection body has a substantially cylindrical basic shape.

5. The conveyor system according to claim 1, wherein at least a part of the surface of the reflection body has incorporated triple prisms.

6. The conveyor system according to claim 1, wherein at least a part of the surface of the reflection body is covered by a reflector foil.

7. The conveyor system according to claim 1, wherein the two conveyor paths run in parallel to one another and wherein the reflection body is arranged between the conveyor paths and the reflection light barrier devices, which are respectively arranged on a side of the conveyor paths facing away from the reflection body.

8. The conveyor system of claim 3, wherein the reflection body is formed as a pentagonal-dodecahedron.

9. The conveyor system of claim 4, wherein the reflection body has a circular base.

* * * * *